United States Patent [19]

Yasuda et al.

[11] 4,417,468
[45] Nov. 29, 1983

[54] SWITCHING DEVICE FOR DETECTING ROTATIONAL POSITIONS OF ROTARY SHAFT

[75] Inventors: Keiichi Yasuda, Ogaki; Takaaki Ori, Nagoya; Kazumasa Nakamura, Okazaki, all of Japan

[73] Assignees: Nippondenso Co., Ltd., Kariya; Toyota Jidosha Kogyo Kabushiki Kaisha, Toyota, both of Japan

[21] Appl. No.: 301,450

[22] Filed: Sep. 11, 1981

[30] Foreign Application Priority Data

Feb. 19, 1981 [JP] Japan ............................ 56-21494[U]

[51] Int. Cl.³ .......................................... G01M 13/02
[52] U.S. Cl. .................................. 73/118; 200/11 K; 200/11 R
[58] Field of Search ...................... 73/118; 200/61-39, 200/11 DA, 11 TW, 11 K, 11 EA, 39 R, 11 R, 11 G, 14, 11 A

[56] References Cited

U.S. PATENT DOCUMENTS

| | | | |
|---|---|---|---|
| 2,116,842 | 5/1938 | Metcalf | 200/61.39 |
| 4,114,002 | 9/1978 | Hochgesang | 200/11 K |
| 4,275,279 | 6/1981 | Wagatsuma et al. | 200/11 DA |

*Primary Examiner*—Charles E. Frankfort
*Assistant Examiner*—David R. Schuster
*Attorney, Agent, or Firm*—Cushman, Darby & Cushman

[57] ABSTRACT

A switching device for detecting the rotational positions of a rotary shaft including a lever rotating with the rotary shaft as a unit, and an electrically conductive plate spring having a central portion and two side portions which is bent and mounted on the lever. The two side portions of the plate spring are each formed with a movable electrical contact, and electrical contacts each juxtaposed against one of the movable electrical contacts on the plate spring are formed in fixed members respectively. Rotation of the lever brings one set of movable and fixed contacts into and out of engagement with each other to detect one rotational position, and further rotation thereof brings the other set of movable and fixed contacts into and out of engagement with each other to detect another rotational position. The plate spring is held in position in flexed condition on the lever by retaining means which has the effect of positively keeping the two contacts with each other. A rotor rotated by the lever with a certain amount of hysteresis may be provided, and the contact cooperating with one of the movable contacts on the plate spring for detecting the second rotational position may be mounted on the rotor. The rotor may further have a plurality of contacts for engaging conductors printed in the form of a comb on a printed board.

4 Claims, 8 Drawing Figures

SWITCHING DEVICE FOR DETECTING ROTATIONAL POSITIONS OF ROTARY SHAFT

BACKGROUND OF THE INVENTION

This invention relates to switching device for detecting the rotational positions of a rotary shaft, and more particularly it is concerned with a switching device suitable for use in detecting whether or not the rotational position of an objective to be detected, such as a throttle valve of an internal combustion engine, has reached a predetermined location.

A switching device of one type known in the art for detecting the rotational positions of a throttle valve is adapted to be rotated by a rotary shaft of the throttle valve and comprises a rotor formed with a guide groove, and three plate springs each having an electrical contact at the forward end. The electrical contact of the center plate spring acting as a movable contact is guided by the guide groove, and the electrical contacts of the rest of the plate springs are fixed contacts.

In this type of switching device of the prior art for detecting the rotational positions of a throttle valve, when the rotary shaft rotates and its rotational position reaches a predetermined position, such as an idling position, the movable contact is brought into contact with one fixed contact and a signal is generated. When further rotation of the rotary shaft brings the shaft to another predetermined position, such as a full loaded position, then the movable contact is brought into engagement with the other fixed contact, thereby generating another signal.

In this device of the prior art, since the actuation of the contacts brought about by the rotation of the rotary shaft is governed by the guide groove, the design of the rotor is a limiting factor, and the guide groove is required to be formed with a high degree of dimensional accuracy. In addition, final adjusting step is required in fabricating such device. With the detecting device of this construction, difficulties are experienced in detecting a vary small deviation in angle (less than 1.5°, for example) from the full open position of the throttle valve.

In another type of roatational position detecting device known in the art, there is provided a rotor rotated by a lever rotated as a unit with the rotary shaft of the throttle valve, with a certain degree of hysteresis between the lever and the rotor. The lever has on one side thereof a plate spring mounting a fixed contact and a plate spring mounting a movable contact for detecting an idling position, and a fixed body is secured to a base plate. The lever has on the other side thereof a plate spring mounting a movable contact and a plate spring mounting a fixed contact for detecting a loaded position which are secured to the rotor. The rotor is provided with three sliders formed of plate spring.

In this device of the prior art, one set of contacts are opened when the rotary shaft has rotated to a predetermined position, and a signal indicating the idling position is generated. Further rotation of the rotary shaft closes the other set of contacts and generates an acceleration pulse signal. Still further rotation generates a signal indicating the full loaded position.

Some disadvantages are associated with this type of detecting device. Difficulties are experienced in adjusting the operation angle, particularly adjusting the detection angle for the idling position. Also, this device raises a problem with regard to resistance to vibration. More specifically, when the device suffers vibration as a whole, the plate springs might vibrate and actuate the contacts even if the lever has not rotated to a predetermined position, thereby inadvertently generating a signal by misoperation Also, the device is complex in construction and its parts are large in number.

SUMMARY OF THE INVENTION

This invention has been developed for the purpose of obviating the aforesaid disadvantages of the prior art. Accordingly the invention has as its object the provision of a switching device for detecting the rotational positions of a rotary shaft, which is simple in construction, compact in size and high in reliability.

According to the invention, there is provided a switching device for detecting the rotational positions of a rotary shaft comprising a lever rotating with the rotary shaft as a unit, an electrically conductive plate spring which is bent and mounted on the lever, the plate spring including a central portion and two sides portions, retaining means formed on the lever for holding each said portion of the plate spring in position in flexed condition, movable electrical contacts each mounted on one of the two side portions of the plate spring, and electrical contacts each juxtaposed against one of the movable electrical contacts.

DETAILED DESCRIPTION OF THE PREFERRED EMBODIMENTS

Figure 1:
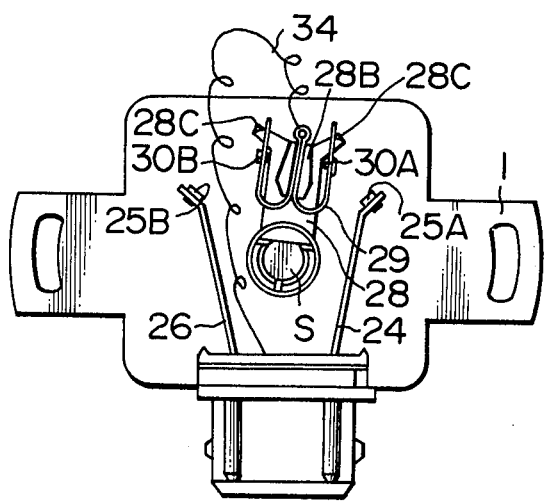
FIG. 1 is a plan view of the switching device comprising one embodiment of the invention.

A first preferred embodiment will be described by referring to FIGS. 1-3. A base plate 1 formed as of sheet iron is arranged in contact with a surface on which a throttle valve of an internal combustion engine, not shown, is mounted. A lever 28 formed as of synthetic resinous material is mounted for rotation as a unit with a rotary shaft S supporting the throttle valve.

A plate 29 substantially in the form of a letter W formed of a conductor, such as beryllium bronze, is attached to the lever 28. As shown in detail in FIG. 2, the plate spring 29 includes a central portion 29A and two side portions 29B located on opposite sides of the central portion 29A and is fixed on the lever 28 by a claw 29C formed in the central portion 29A and engaged in an opening 28A and by a projection 28B formed in the lever 28 as shown in FIG. 3. The lever 28 is formed with a pair of projections 28C each in the form of a half of a cylinder constituting retaining means for holding the two side portions 29B of the plate spring 29 in position in inwardly flexed condition. The side portions 29B of the plate spring 29 are formed with electrical contacts 30A and 30B on outer sides thereof respectively.

A pair of fixed members 24 and 26 formed with electrical contacts 25A and 25B contacting with the electrical contacts 30A and 30B respectively are formed of conductive metal, such as phosphor bronze, sheet iron, sheet copper, etc., and located such that the electrical contacts 25A and 25B are juxtaposed against the electrical contacts 30A and 30B on the plate spring 29 respectively. As the electrical contacts 25A and 30A are brought into and out of engagement with each other, the idling position (full closed position) is detected; and as the electrical contacts 25B and 30B are brought into and out of engagement with each other, the full loaded position (full open position) is detected. In the drawings, the numeral 34 designates a wire connected in a movable contact or the plate spring 29.

In the switching device shown in FIG. 1, rotation of the throttle valve causes the lever 28 to rotate. As the electrical contact 30A on the plate spring 29 is brought into and out of engagement with the electrical contact 25A on the fixed member 24, the idling position is detected; and as the electrical contact 30B on the plate spring 29 is brought into and out of engagement with the electrical contact 25B on the fixed member 26, the full loaded position is detected.

Figure 4:
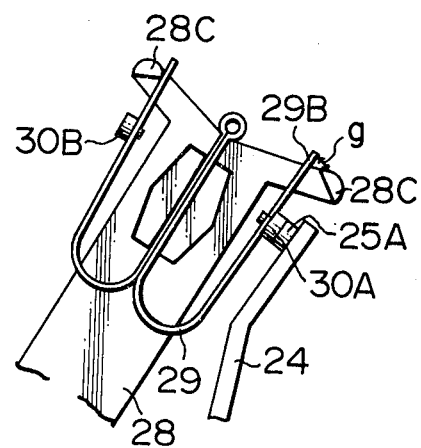
FIG. 4 is a plan view, shown on an enlarged scale, of the essential portions shown in FIG. 1 as the rotary shaft rotates.

Since the two side portions 29B of the plate spring 29 of this embodiment are held in position in flexed condition by the projections 28C respectively, the electrical contacts 30A and 25A are brought into engagement with each other and then the projection 28C is slightly released from engagement with the side portion 29B of the plate spring 29 as indicated by a gap g in FIG. 4, when the lever 28 is rotated to bring the electrical contact 30A into engagement with the electrical contact 25A on the fixed member 24. Thus, the spring force developed by the side portion 29B of the plate spring 29 urges the contact 30A against the contact 25A, then these electrical contacts 30A and 25A are positively kept in engagement with each other.

By virtue of the two side portions 29B of the plate spring 29 being held in position in flexed condition by the projections 28C, misoperation of the electrical contacts 25A, 25B, 30A and 30B the might otherwise take place due to vibration of the switching device and other factor can be effectively avoided. The fact that the two side portions 29B of the plate spring 29 are held in position in flexed condition enables adjustments of the position to be detected to be readily effected merely by bending the fixed members 24 and 26 to a desired degree.

Another embodiment of the invention will be described by referring to FIG. 5 in which parts same as or similar to those shown in FIGS. 1-4 are designated by like reference characters.

Mounted for rotation with the rotary shaft S of the throttle valve as a unit is a lever 42 which rotates a rotor 2 formed as of synthetic resinous material. Although rotated by the lever 42, the rotor 2 is mounted such that there is a certain amount of hysteresis between the rotor 2 and the lever 42 in rotation.

The plate spring 29 substantially in the form of a letter W is mounted on the lever 42. The lever 42 and plate spring 29 are substantially similar to the lever 28 and plate spring 29 described by referring to the FIGS. 1-4. The plate spring 29 includes a central portion 29A supported by the projection 28B, and two side portions 29B disposed on opposite sides of the central portion 29A having the electrical contacts 30A and 30B respectively. The two side portions 29B are held in position in flexed condition by projections 29C in the form of a half of a cylinder formed in the lever 42.

On one side of the lever 42 (lower side in FIG. 5), an electrical contact 25A mounted on a fixed member 32 is provided for detecting the idling position.

On the other side of the lever 42, a fixed member 31 mounting an electrical contact 25B for detecting the loaded position is secured to the rotor 2 by a rivet 15 formed as of copper. The rotor 2 has attached thereto three sliders 7, 8B and 8A formed of plate spring each having an electrical contact 10 mounted thereon. A printed board 9 with conductors printed thereon in the form of a comb is secured to the base plate 1 as by rivets 16.

The numeral 33 designates an insert mounted between the printed board 9 and the base plate 1, and the numeral 34 designates a wire for electrically connecting the sliders 7, 8 and 8A with the plate spring 29.

Figure 5:
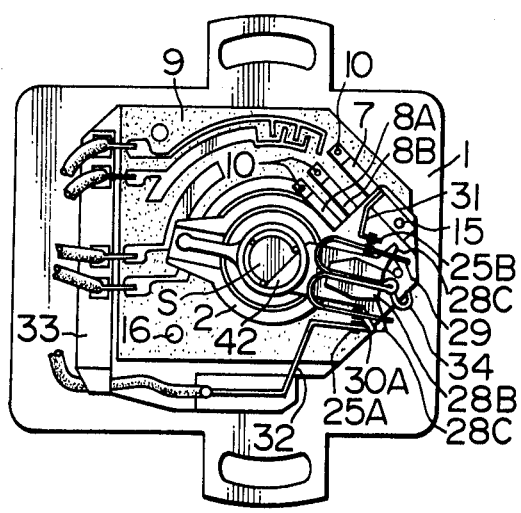
FIG. 5 is a plan view of the switching device comprising another embodiment.

In the switching device shown in FIG. 5, rotation of the lever 42 brings the electrical contact 25A on the fixed member 32 into and out of engagement with the electrical contact 30A on the plate spring 29, to detect the idling position. Further rotation of the rotary shaft S brings the electrical contact 30B on the plate spring 29 into engagement with the electrical contact 25B on the fixed member 31, so that the contact 10 on the slider 7 of the rotor 2 moves in sliding movement on one of the conductors printed on the printed board 9 in the form of a comb and issues an acceleration signal. Further rotation of the rotary shaft S brings the slider 8B into contact with another conductor to issue a signal indicating a full loaded condition. In deceleration, the lever 42 is rotated in the reverse direction to bring the electrical contacts 30B and 25B out of engagement with each other, so that no acceleration signal is issued.

Figure 2:
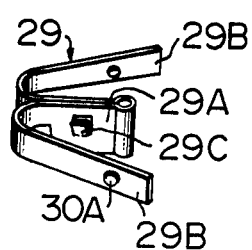
FIG. 2 is a perspective view, shown on an enlarged scale, of the plate spring shown in FIG. 1.
Figure 3:
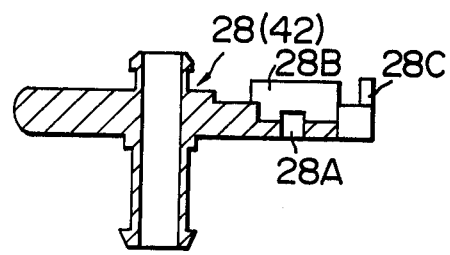
FIG. 3 is a sectional view, shown on an enlarged scale, of the lever shown in FIG. 1.
Figure 6:
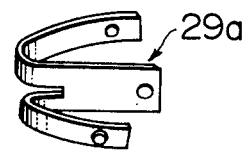
FIGS. 6, 7 and 8 are perspective views of modifications of the plate spring shown in FIG. 5.
Figure 8:
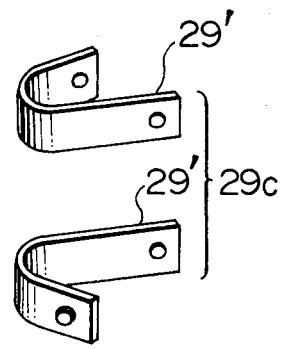
Figure 7:
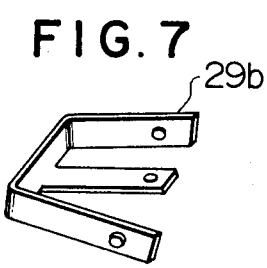

The plate spring 29 has been described as having the shape shown in FIG. 2. However, the invention is not limited to this specific form of the plate spring 29, and the plate spring 29 may be of any shape as desired, such as the plate springs 29a, 29b shown in FIGS. 6 and 7. It is also possible to provide the plate spring 29c in the form of a letter W by connecting together in back-to-back relation two U-shaped plate spring pieces 29' as shown in FIG. 8.

The invention has been shown and described hereinabove by referring to embodiments incorporated in a device for detecting the rotational position of the throttle valve of an automotive vehicle. It is to be understood, however, that the invention is not limited to these embodiments and that the switching device according to the invention can be used in any application as an ordinary switching device.

It will be appreciated from the foregoing description that the switching device according to the invention has high reliability in spite of its being simple in construction and compact in size.

What is claimed is:

1. A switching device for detecting the rotational position of a rotary shaft, comprising:
   a lever provided for rotating with the rotary shaft;
   a rotor rotated by the lever with a certain amount of hysteresis between the rotor and the lever;
   an electrically conductive plate spring which is bent and mounted on the lever, said plate spring including a central portion which is fixed on said lever and two side portions each disposed on one side of the central portion;

projections formed on the lever for holding the side portions of the plate spring in position in fixed condition;

first and second movable electrical contacts each mounted on one of the side portions of the plate spring;

a first electrical contact formed on a fixed member for cooperation with said first movable electrical contact for detecting a first rotational position of the rotary shaft; and a second electrical contact formed on the rotor for cooperation with said second movable electrical contact for detecting a second rotational position of the rotary shaft.

2. A switching device as claimed in claim 1, wherein said plate spring is bent substantially in the form of a letter W.

3. A switching device as claimed in claim 1, wherein said plate spring is formed by connecting in back-to-back relation two plate spring pieces each bent in the form of a letter U.

4. A switching device for detecting the rotational position of a rotary shaft, comprising:

a lever provided for rotating with the rotary shaft;

a rotor rotated by the lever with a certain amount of hysteresis between the rotor and the lever;

an electrically conductive plate spring which is bent and mounted on the lever, said plate spring including a central portion and two side portions each disposed on one side of the central portion;

projections formed on the lever for holding the side portions of the plate spring in position in fixed condition;

first and second movable electrical contacts each mounted on one of the side portions of the plate spring;

a first electrical contact formed on a fixed member for cooperation with said first movable electrical contact for detecting a first rotational position of the rotary shaft;

a second electrical contact formed on the rotor for cooperation with said second movable electrical contact for detecting a second rotational position of the rotary shaft;

a printed board on which conductors are printed in the form of a comb; and a plurality of contacts mounted on the rotor for engagement with the conductors on the printed board.

* * * * *